United States Patent
Ziavras et al.

[11] Patent Number: 5,887,823
[45] Date of Patent: Mar. 30, 1999

[54] GIMBAL MECHANISM AND GEARBOX FOR SAME

[75] Inventors: John Ziavras, Hermosa Beach; Richard L. Walton, El Segundo, both of Calif.

[73] Assignee: Hughes Electronics Corporation, Los Angeles, Calif.

[21] Appl. No.: 883,412

[22] Filed: Jun. 26, 1997

[51] Int. Cl.$^6$ .................................................. B64D 27/00
[52] U.S. Cl. .............................. 244/56; 244/172; 244/169
[58] Field of Search ........................... 244/54, 56, 158 R, 244/169, 172, 173; 74/724, 425; 248/278.1, 280.11, 554

[56] References Cited

U.S. PATENT DOCUMENTS

| | | | |
|---|---|---|---|
| 3,451,648 | 6/1969 | Pabst et al. | 244/56 |
| 4,133,501 | 1/1979 | Pentlicki | 244/173 |
| 4,419,033 | 12/1983 | Roth et al. | 244/173 |
| 5,332,181 | 7/1994 | Schweizer et al. | 248/280.11 |
| 5,738,308 | 4/1998 | Haag | 244/169 |

*Primary Examiner*—Galen L. Barefoot
*Attorney, Agent, or Firm*—Terje Gudmestad; Georgann S. Grunebach; Michael W. Sales

[57] ABSTRACT

There is disclosed an angle positioning platform for positioning objects around first and second axes and a gearbox for same. The platform comprises a base, an intermediate stage, and an upper stage. The platform may have motors and first and second output gearboxes connected to the motors for driving the platform. The orientation of the stages of the platform permits the platform to be relatively compact in a stowed position and to have high angular rotation from the stowed position to a maximum travel position. The gearboxes may have a mechanism for isolating worm shafts and wormgears from heavy loads when the platform is in the stowed position. Another aspect of the invention is an output gearbox with a wormgear having stops for stopping rotation of a matingly engaged worm. Another aspect of the invention is a gearbox having torsion springs to counter backlash in the gearbox. Such a gearbox has a wormgear and a torsion spring retainer plate, one or both of which have a plurality of holes to permit adjusting the torque of a torsion spring in the gearbox by providing a plurality of positions for the ends of a spring to be placed with respect to one another. A suitable fuel line assembly is disclosed to connect an ion thruster that is mounted in the platform to a fuel tank, the fuel line assembly comprising two bellows tubes and an elbow joint.

22 Claims, 16 Drawing Sheets

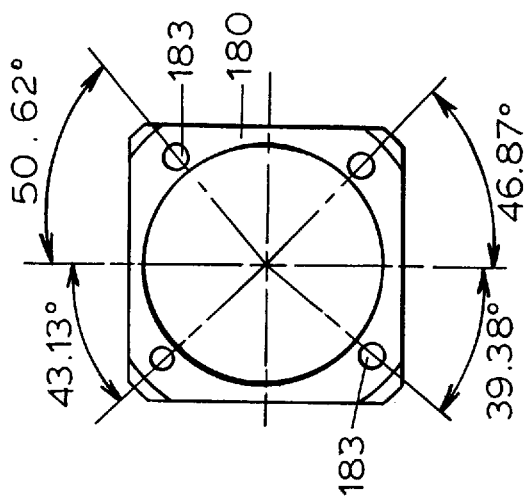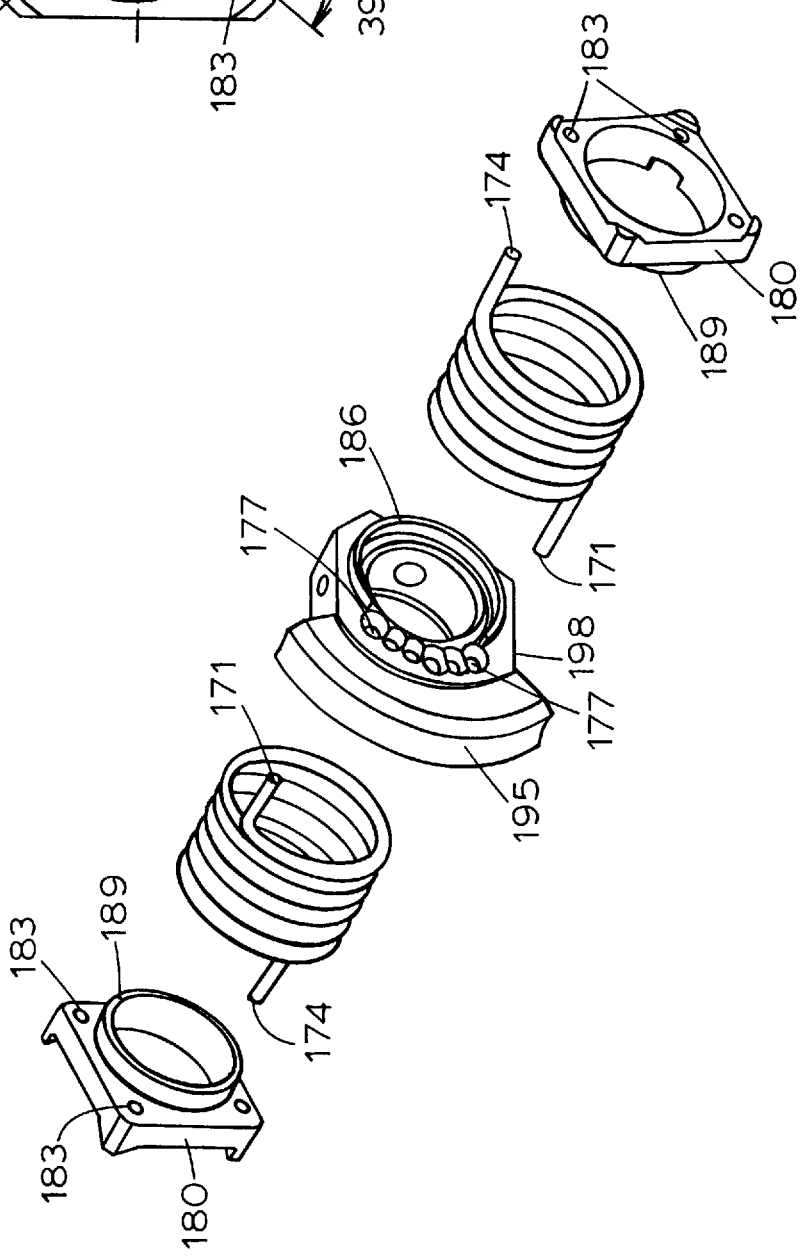

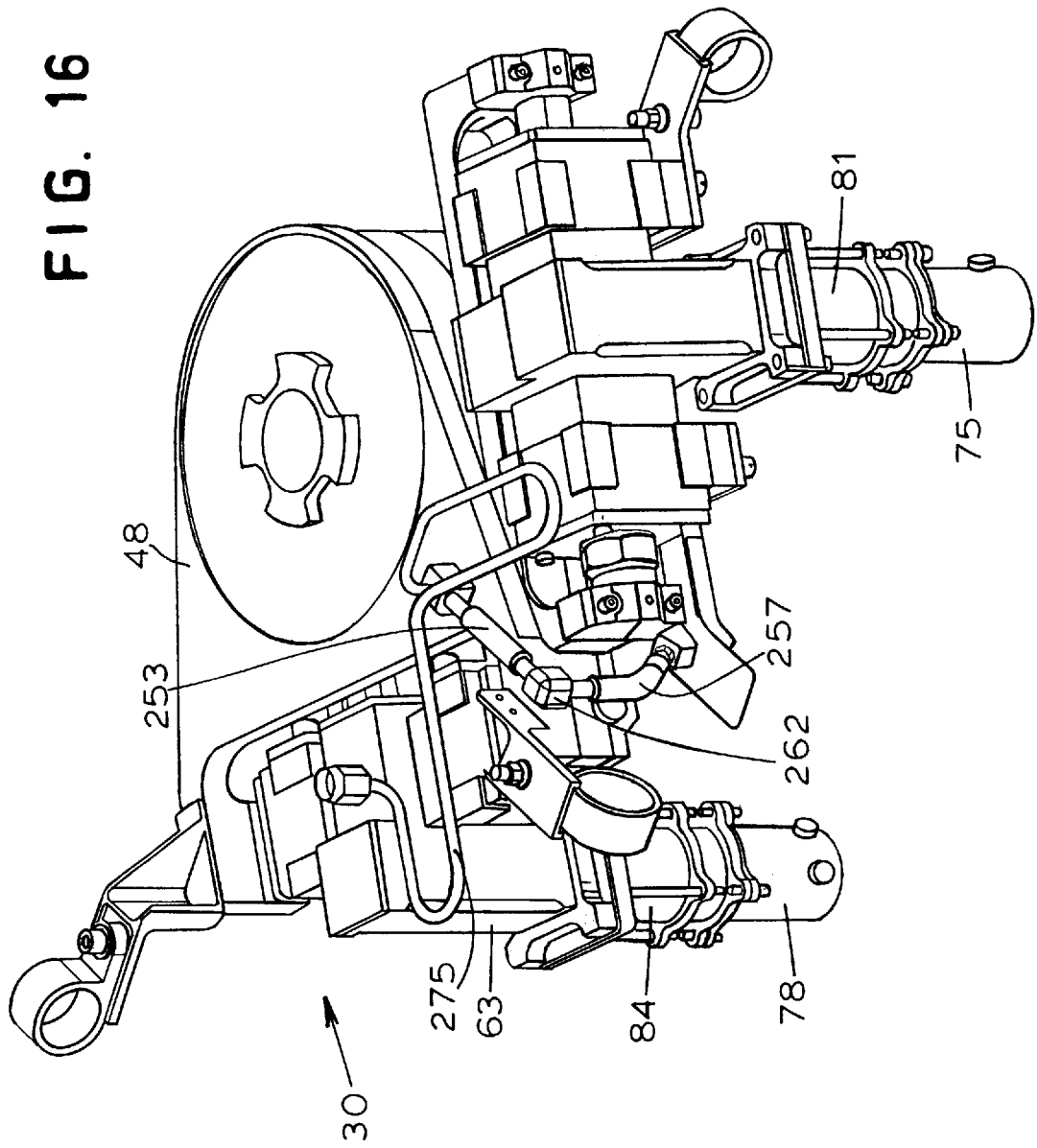

GIMBAL MECHANISM AND GEARBOX FOR SAME

BACKGROUND OF THE INVENTION

The present invention is directed generally to angle positioning platforms. More particularly, the present invention is directed to angle positioning platforms or gimbals for positioning payload such as a spacecraft engine around first and second axes.

Positioning platforms are commonly used to move an object on first and second axes. Typically, the first and second axes are perpendicular to one another. Conventional angle positioning platforms have a number of limitations. When positioning some objects, a large range of rotational motion is necessary. For example, in some spacecraft an engine must be moved from a stowed position during launch, to a working position during transfer orbit, and finally to a new working position once on station. In the working positions the engine may require bidirectional angular adjustments. Movement from the stowed position to the transfer orbit working position, or from this position to the on station working position may require large angular rotation (e.g., 25 to 35 degrees). In the working positions the engines periodically need small angular adjustments (e.g., 0 to 5 degrees).

Some conventional angle positioning platforms lack a rotational range wide enough to carry a payload (e.g., engine) from the stowed position to a working position (e.g., transfer orbit position) and from one working position to another (e.g., on station position). These applications generally require two devices: a deployment actuator for large angle motion from the stowed position to the working position and a positioning device for the small angular adjustment required in the working position. Such a system usually cannot accommodate two working positions.

Another shortcoming of some conventional angle positioners, particularly those positioners having two output gearboxes, is the large amount of space and weight required for such positioners.

Another shortcoming of some conventional angle positioning platforms is the vulnerability to damage during heavy loads such as may be experienced in spacecraft during launch. Angle positioning platforms typically include precise gears and bearing assemblies. During launch, the gears and bearing assemblies undergo stresses that may impair the later performance of the positioning platform. These stresses experienced by the gears and bearing assemblies are greater when the positioning platform is supporting a heavy object. Thus, many conventional positioning platforms are not capable of supporting large loads such as heavy engines (e.g., ion engines). In some conventional platforms, heavy components must be used in order to have enough strength to withstand the stresses encountered during launch. Yet those heavy components are stronger than necessary to perform during on station use.

Thus, there is a need for 2-axis positioning platforms that have high angular ranges and that are also compact, lightweight, and capable of withstanding high stresses, such as stresses encountered during launch. There is also a need for a 2-axis positioning platform that reduces the load experienced by delicate components of the platform during launch.

Some drive mechanisms for motor-driven positioning platforms include wormgear assemblies or gearboxes to convert rotation of a motor into rotation of a member about a particular axis. Wormgear assemblies typically have a worm shaft having a worm, a wormgear with teeth in mating engagement with the worm, and a main shaft connected to the wormgear. Backlash between the wormgear and the worm shaft is minimized in some conventional wormgear assemblies by torsion springs disposed around the main shaft. However, the torque provided by torsion springs varies within manufacturing tolerances and, consequently, requires some conventional assemblies to use larger, heavier springs than would otherwise be necessary in order to tolerate the variation and provide torque in the required range. Alternatively, more expensive torsion springs may be required which are made to tighter tolerances.

Further, torsion springs often come into contact with the main shaft, creating friction that effectively lessens the torque provided by the springs and possibly generating debris. To compensate for the decrease in torque from friction, heavier, stronger springs are sometimes required. Thus, there is a need for an antibacklash mechanism that reduces friction between the springs and the main shaft.

In some typical devices having wormgear assemblies, a member is connected to the main shaft of the wormgear assembly for rotation with the main shaft. In some of these devices, rotation of the worm shaft is stopped, when desired, by impeding movement of the member. The impeding of the member stops the rotation of the main shaft which, in turn, stops the rotation of the wormgear. In these conventional wormgear assemblies, the worm stops rotating when the friction and other forces between the worm and the wormgear teeth prevent further worm rotation.

When the worm is stopped as described above, a number of undesirable consequences arise. The components in the drive train between the wormgear and the member attached to the main shaft are placed under stress. Also, the worm becomes wedged against the wormgear teeth. This wedging of the worm creates wear on the wormgear assembly and may, if the rotational force of the worm is high enough, permanently deform either the worm or the wormgear teeth. Furthermore, the worm might become wedged so forcefully against the wormgear teeth that the worm becomes jammed in the wormgear and cannot be rotated in the opposite direction. Such a circumstance would prevent subsequent repositioning of the platform.

Thus, there is a need for a wormgear assembly having an antibacklash system without the aforementioned problems. There is also a need for a mechanism for stopping rotation of the wormgear without the aforementioned problems.

When an engine is mounted on a positioning platform, the engine may undergo a large angular rotation. The fuel line has an end connected to the engine and thus the fuel line must be able to withstand and not inhibit the rotation of the engine. Ion engines are particularly sensitive to impurities and water vapor. Conventional flexible materials, such as plastic, often are not suitable for use with ion engines because of evolving impurities and the tendency of conventional flexible materials to trap water vapor.

Metallic fuel lines may be used to avoid the problems of water vapor and other impurities. However, solid metallic fuel lines are limited in angular flexibility and are susceptible to fatigue failure, therefore limiting their life in cyclic flexing applications. Corrugated or bellows tubing has much greater elastic angular flexibility and may be used effectively about a single axis. In a two axis application, a single bellows tube would experience axial torsion in addition to bending. The bellows tube does not have elastic flexibility in torsion and therefore resists this motion and will prematurely fail due to fatigue. A separate bellows tube could be used for each axis, however, this would require additional plumbing and mounting hardware, thus requiring greater space and weight.

Also, some conventional fuel lines are made from materials that require the fuel lines to be relatively long in order to have sufficient flexibility. Such long fuel lines require loops and guides which add weight to the spacecraft. Thus, there is a need for a fuel line assembly that is composed of materials suitable for use with spacecraft ion engines, that is compact, that can accommodate the rotation of the engine on two axes and that is not susceptible to premature fatigue failure.

SUMMARY OF THE INVENTION

The aforementioned disadvantages of the prior art are overcome by the apparatus of the present invention. In particular, an angle positioning platform for positioning objects around first and second axes comprises a base, a launch lock seat connected to the base, an intermediate stage having first and second sides, first pivoting means comprising a first worm shaft and a first set of bearings adapted to engaged the first worm shaft, the first pivoting means being mounted to the base and the first side of the intermediate stage for pivoting the intermediate stage around the first axis, and second pivoting means comprising a second worm shaft and a second set of bearings adapted to engage the second worm shaft, the second pivoting means being connected to the second side of the intermediate stage. The angle positioning platform further comprises an upper stage connected to the second pivoting means, the second pivoting means pivoting the upper stage around the second axis. Means for isolating sensitive components (e.g., bearings and gears) from loads is provided within one or both of the pivoting means. The isolation means for isolating vibration from the sets of bearings may include means for unseating a worm shaft from an adjacent set of bearings. The worm shaft may disengage from the set of bearings while the upper stage is locked into a stowed position. The stowed position is the launch locked position wherein the load path between the worm shafts and the respective bearings is eliminated, thereby isolating the bearings and gears from heavy loads.

In another embodiment, the angle positioning platform for positioning an object along first and second axes is located on a spacecraft and comprises a base connected to the spacecraft, a launch lock seat connected to the base, an inboard output gearbox mounted to the base, and an intermediate stage having first and second sides. The first side is substantially parallel to the first axis, the second side is substantially parallel to the second axis, the first side is connected to the inboard output gearbox, and the inboard output gearbox positions the object around the first axis. The platform also includes an outboard output gearbox connected to the second side of the intermediate stage, the outboard output gearbox positioning the object around the second axis, and an upper stage connected to the outboard output gearbox for mounting the object. The first and second axes are substantially coplanar and substantially perpendicular to one another.

The first and second sides of the intermediate stage may define a space therebetween in which at least a part of the launch lock seat is located. The upper stage may matingly engage the launch lock seat when the platform is in a locked position. Further, when the angle positioning platform is in the locked position, a solid load path may be formed from the upper stage to the launch lock seat, the solid load path normally directing loads in a direction that bypasses the intermediate stage.

A further aspect of the invention is an antibacklash mechanism for an output gearbox having a wormgear. The mechanism comprises a main shaft connected to the wormgear, and a spring mounted around the main shaft for biasing the wormgear and having a first end, a first end portion, a second end, and a second end portion. The mechanism also comprises a spring retainer plate having a hole for receiving the first end of the spring. The wormgear has a hole for receiving the second end of the spring. Either the wormgear, the spring retainer plate, or both the wormgear and the spring retainer plate have a plurality of holes for receiving an end of the spring.

The antibacklash mechanism may be used in an angle positioning platform for positioning objects around first and second axes such as the platforms summarized above.

A further aspect of the present invention is an output gearbox comprising a main shaft, a wormgear connected to the main shaft and having teeth and spaces defined between the teeth in a peripheral portion of the wormgear, and a worm shaft having a worm adapted to engage the teeth of the wormgear, the worm having a thread that terminates at a first end. The wormgear has a first stop disposed adjacent one of the teeth for stopping the rotation of the worm shaft by contacting the first end of the worm thread. The first end of the worm may be substantially flat and define a plane that is substantially parallel to a longitudinal axis of the worm shaft. The first stop may be substantially flat and define a plane that is substantially perpendicular to the main shaft.

An output gearbox comprising a wormgear with a stop for stopping rotation of a worm shaft may be included in an angle positioning platform for positioning objects around first and second axes.

A further aspect of the invention is a fuel line assembly for connecting a fuel tank to a spacecraft engine. The fuel line assembly comprises an elbow joint having first and second apertures and a passage therebetween, a first metal bellows tube attached to the first aperture, and a second metal bellows tube attached to the second aperture. The first tube and the second tube may be substantially perpendicular to one another in a free state. A propulsion tube having first and second ends may connect the first tube to an ion thruster.

BRIEF DESCRIPTION OF THE DRAWINGS

FIG. 9 is an exploded view of an antibacklash spring assembly including spring retainer plates in accordance with the present invention with the main shaft removed for clarity;

FIG. 10 is a side elevational view of the spring retainer plate of FIG. 9;

FIG. 16 is a perspective of a gimbal in the stowed position having a fuel line assembly in accordance with the present invention;

DETAILED DESCRIPTION OF THE INVENTION

Figure 1:
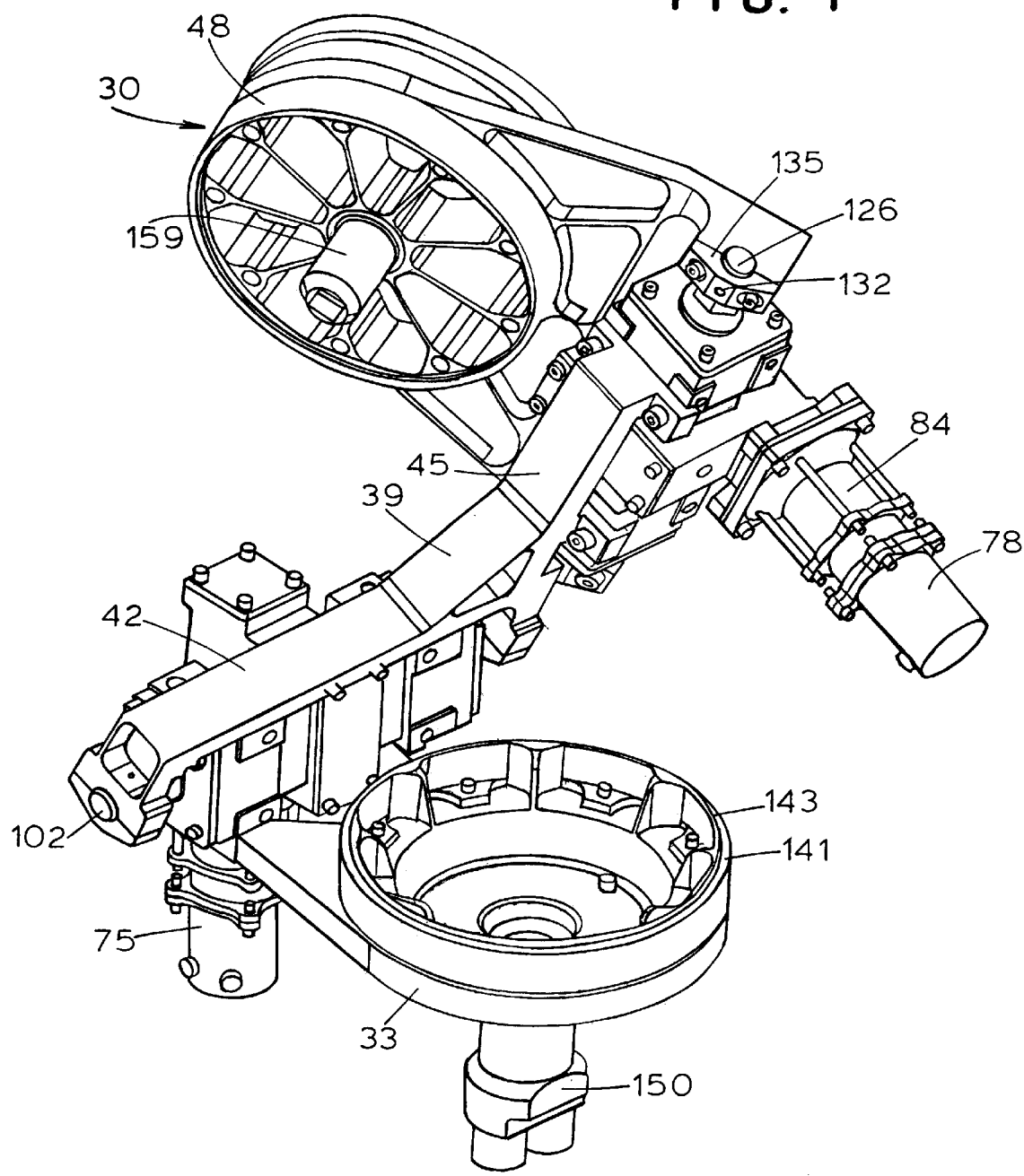
FIG. 1 is a perspective of a gimbal in accordance with the present invention in a maximum travel position.
Figure 2:
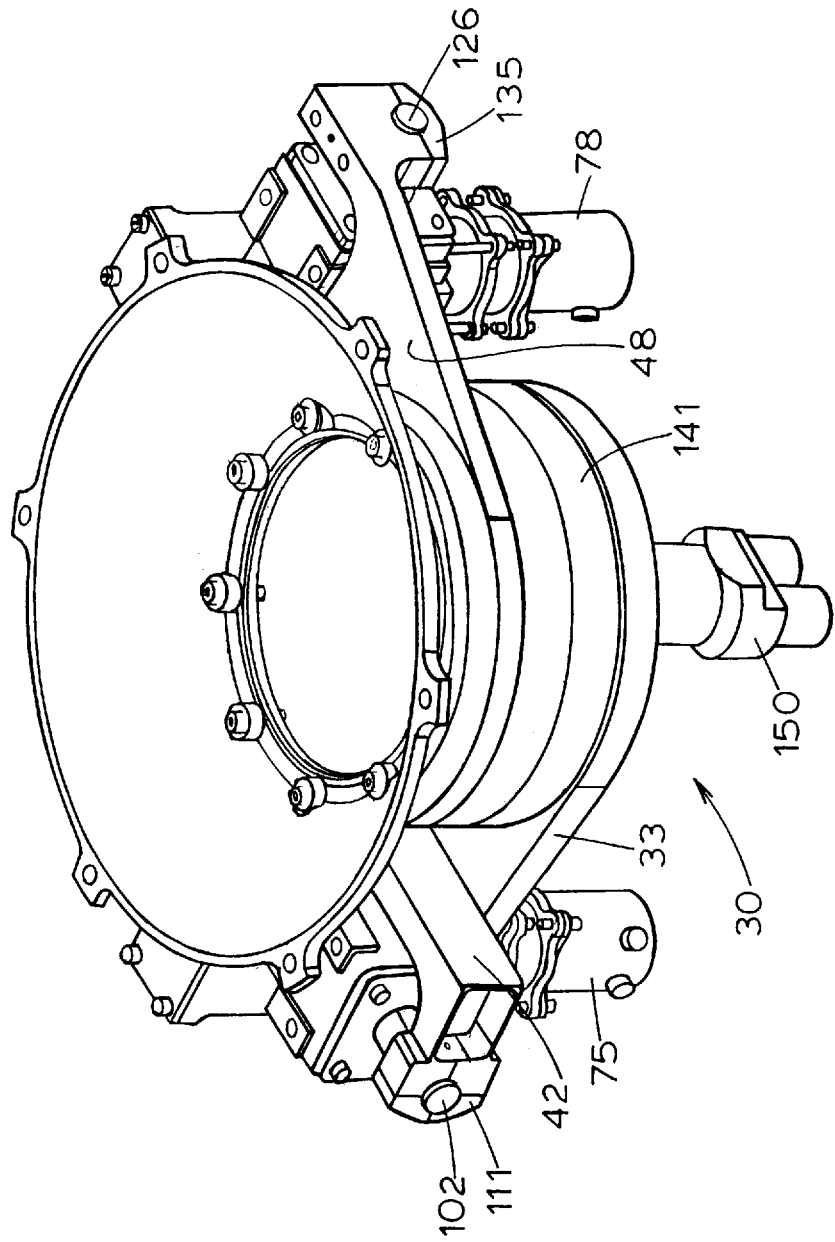
FIG. 2 is a perspective of the gimbal of FIG. 1 in a stowed position and shown with a cone adaptor.
Figure 3:
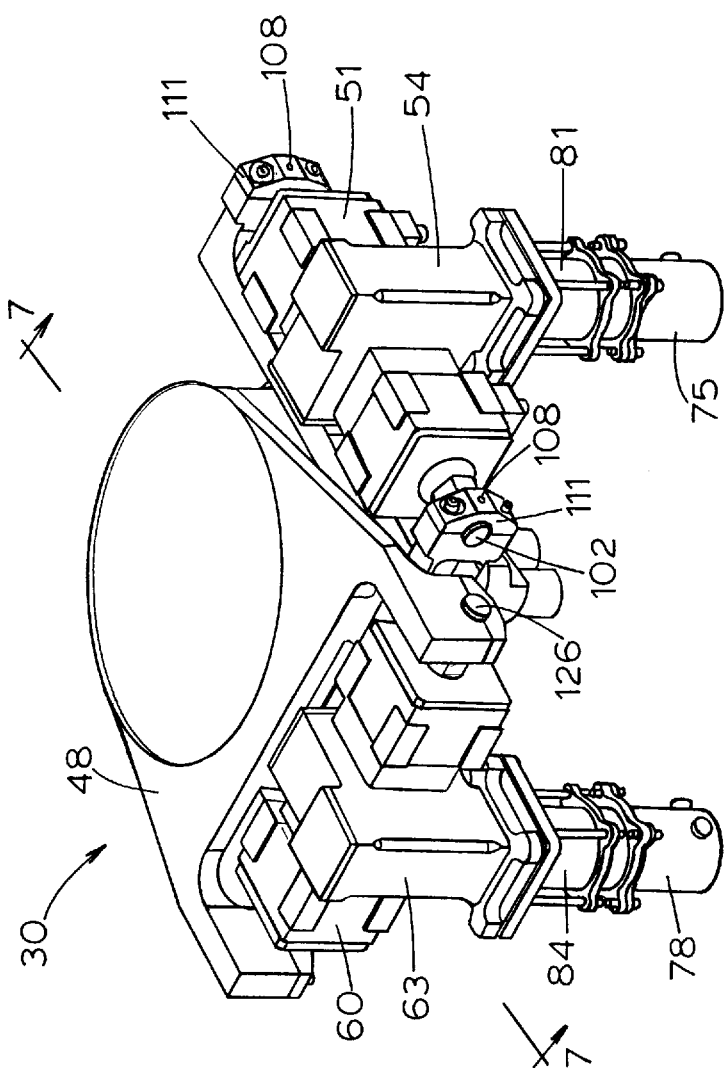
FIG. 3 is another perspective of the gimbal of FIG. 1 in the stowed position.
Figure 4:
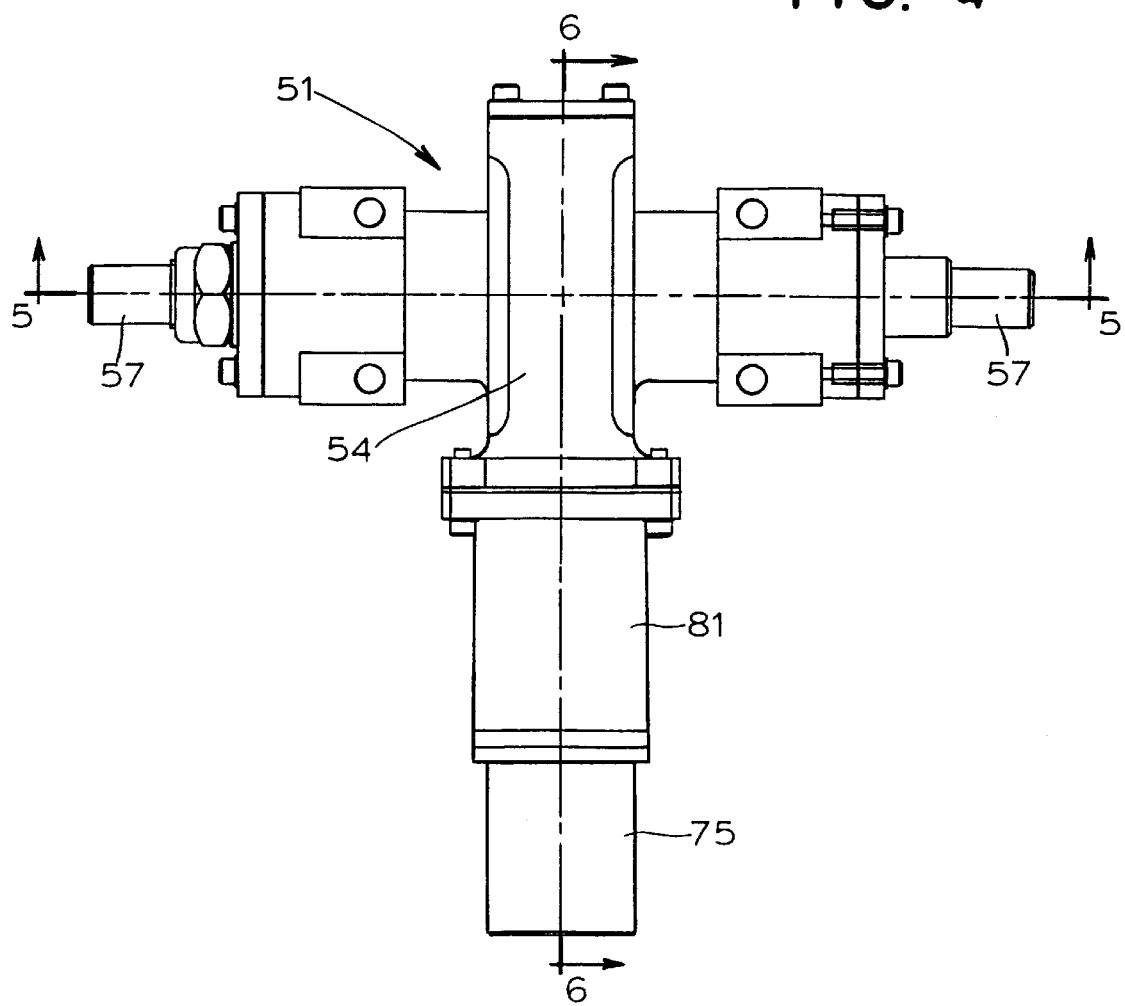
FIG. 4 is a side elevational view of an output gearbox, motor, and gearhead in accordance with the present invention.

An apparatus in accordance with the present invention is designated at 30 and is shown, in various stages of extension, in FIGS. 1–3. As best seen in FIG. 1, the gimbaled platform or angle positioner 30 includes a base 33 which can be connected to a spacecraft (not shown), an intermediate stage 39 having a first side 42 connected to the base 33 and a second side 45. An upper stage 48 of the gimbaled platform 30 is connected to the second side 45 of the intermediate stage 39. The upper stage 48 can be shaped to hold an engine such as an ion thruster.

An inboard or first output gearbox 51, including a housing 54, is mounted to the base 33 and has a main shaft 57 mounted to the first side 42 of the intermediate stage 39. A second or outboard output gearbox 60, including a housing 63, is mounted on the second side 45 of the intermediate stage 39 and has a main shaft 66 mounted to the upper stage 48. The first output gearbox 51 moves the intermediate stage 39 with respect to the base 33 around a first axis. The second output gearbox 60 moves the upper stage 48 with respect to the intermediate stage 39 around a second axis. The first axis may be substantially perpendicular to the second axis.

Figure 5:
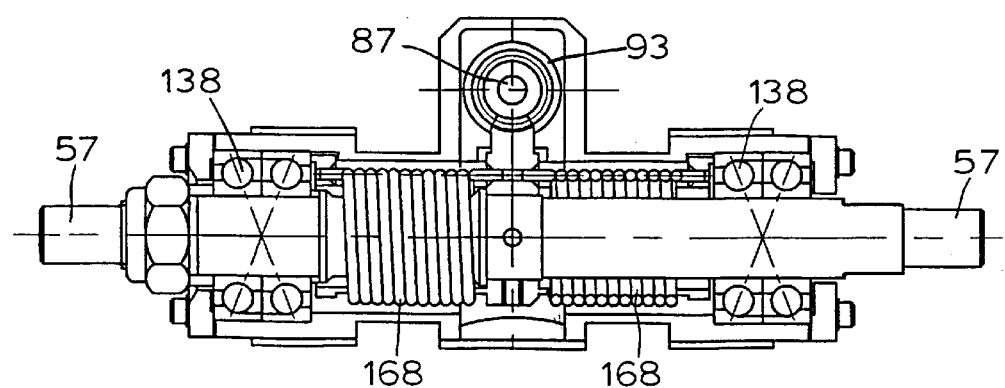
FIG. 5 is a sectional view of the output gearbox, motor, and gearhead of FIG. 4 taken along line 5—5 in FIG. 4.
Figure 6:
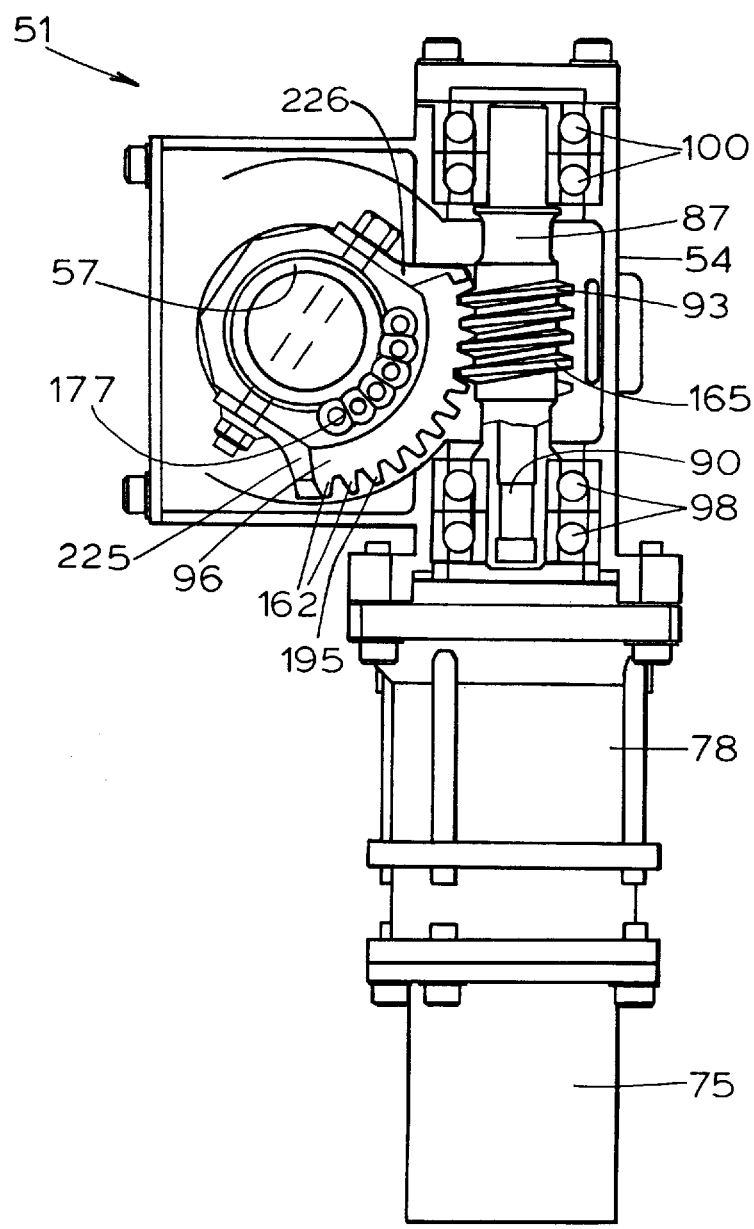
FIG. 6 is a sectional view of the output gearbox, motor, and gearhead of FIG. 4 taken along line 6—6 in FIG. 4.
Figure 8:
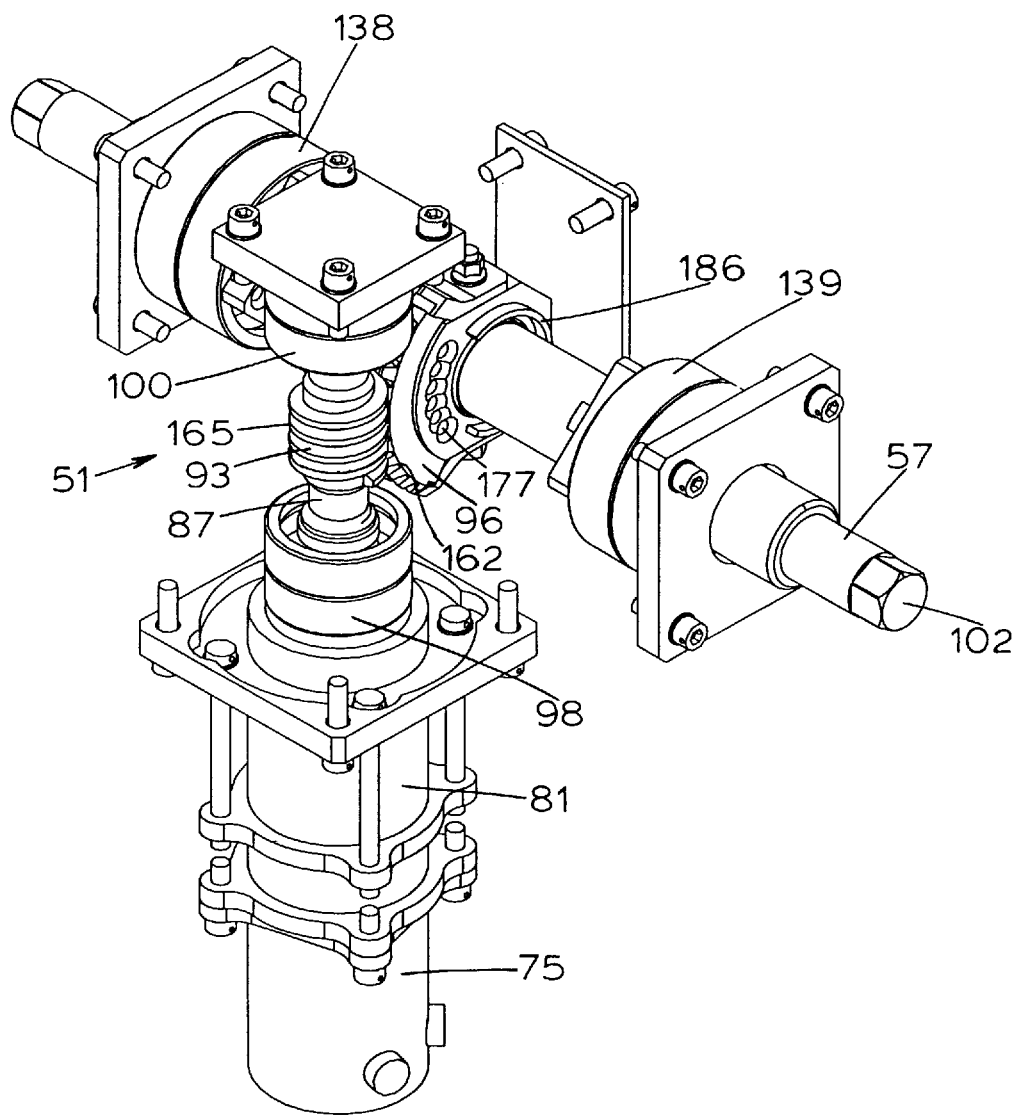
FIG. 8 is a perspective view, with portions of the housing removed, of an output gearbox in accordance with the present invention.

As seen in FIGS. 5, 6, and 8, the inboard output gearbox 51 includes a worm shaft 87 having a worm portion or worm 93 adapted to matingly engage a wormgear 96 disposed adjacent the worm 93. The worm shaft 87 may be removably mounted in a first set of bearings 98 and a second set of bearings 100. The sets of bearings 98, 100 may be duplex bearings, roller bearings, or any other suitable bearings. A single bearing may be suitable in place of the first set of bearings 98, and a single bearing may be suitable in place of the second set of bearings 100.

To drive the first output gearbox 51, a motor 75 is connected to a gearhead 81, which is coupled to the worm shaft 87 by a spline connection 90 or other connection permitting longitudinal movement of the worm shaft 87 relative to the gearhead 81. The motor 75 is preferably a stepper motor.

Attached to and extending through the wormgear 96 is the main shaft 57 having ends 102. The main shaft 57 of the inboard output gearbox 51 is attached to the first side 42 of the intermediate stage 39 at the main shaft ends 102 by a pin 108 (FIG. 3) extending through the intermediate stage 39 and through the main shaft 57. A clamp 111 (FIGS. 1 and 3) connected to the main shaft 57 also secures the intermediate stage 39 to the main shaft 57. The first side 42 of the intermediate stage 39 is thus mounted for rotation with the main shaft 57 of the inboard output gearbox 51 around the first axis.

Figure 7:
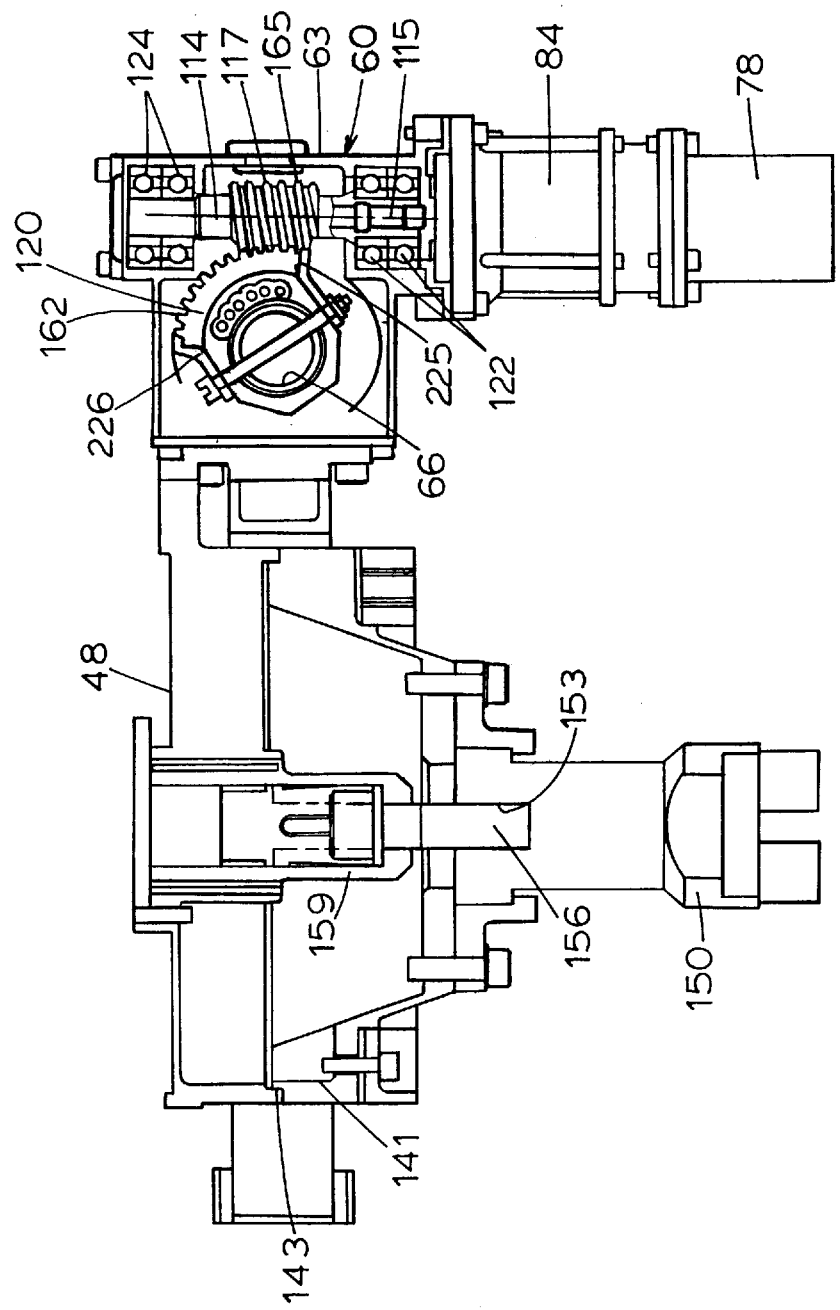
FIG. 7 is a sectional view of the gimbal of FIG. 1 taken along line 7—7 of FIG. 3.

The outboard output gearbox 60 is shown in FIG. 7 and is similar to the inboard gearbox 51. The housing 63 of the outboard output gearbox 60 is fixed to the second side 45 of the intermediate stage 39. The outboard output gearbox 60 includes a worm shaft 114 having a worm portion or worm 117 adapted to matingly engage a wormgear 120 disposed adjacent the worm 117. The worm shaft 114 may be removably mounted in a first set of bearings 122 and a second set of bearings 124. The sets of bearings 122, 124 may be duplex bearings, roller bearings, or any other suitable bearings. A single bearing may be suitable in place of the first set of bearings 122, and a single bearing may be suitable in place of the second set of bearings 124.

To drive the second output gearbox 60, a motor 78 is connected to a gearhead 84, which is coupled to the worm shaft 114 by a spline connection 115 or other connection permitting longitudinal movement of the worm shaft 114 relative to the gearhead 84. The motor 78 is preferably a stepper motor.

Attached to and extending through the wormgear 120 is the main shaft 66 having ends 126. The main shaft 66 of the outboard output gearbox 60 is attached to the upper stage 48 by pins 132 (FIG. 1) extending through the upper stage 48 and through the ends 126 of the main shaft 66. Clamps 135 (FIG. 1) connected to the main shaft 66 also secure the intermediate stage 39 to the main shaft 66. The upper stage 48 is thus mounted for rotation with the main shaft 66 of the outboard output gearbox 60 around the second axis. When used with a payload which operates at high temperatures, such as an ion engine, a thermal insulating layer, such as a suitable nonmetal, may be placed between the main shaft 66 and the upper stage 48.

The main shaft 57 of the inboard output gearbox 51 may be attached to the intermediate stage 39 by other means such as splines, keys, bolts, and clamps. Similarly, the main shaft 66 of the outboard output gearbox 60 may be attached to the upper stage 48 by other means such as splines, keys, bolts, and clamps. The main shafts 57, 66 are mounted on a first set of bearings 138 (FIG. 8) and a second set of bearings 139 (FIG. 8). The worms 93, 117 and wormgears 96, 120 are lubricated with low volatility grease.

Examples of performance characteristics of the output gearboxes 51, 60 are as follows. The wormgears 96, 120 may have a gear ratio of approximately 40:1. The motors 75, 78 may be four phase, unipolar, 90° stepper motors. The gearheads 81, 84 may be three stage planetary gearheads having gear ratios of approximately 180:1 to 345:1. More generally, any combination of gearing is suitable if the gearing results in a desired precision in the output of the main shafts 57, 66. For example, if 0.0125°/step of the motors 75, 78 is desired, then a 40:1 wormgear 96, 120 and a 180:1 gearhead 81, 84 would achieve that level of output precision, but combinations using wormgears 96, 120 and gearheads 81, 84 having other gear ratios resulting in 0.0125°/step would also be suitable. Structural components such as the base 33, the intermediate stage 39, and the upper stage 48 may be machined from aluminum.

As seen in FIGS. 1–3, and 7, the upper stage 48 may be removably attached to a launch lock seat 141. In this position, a stowed or locked position, the gimbaled platform 30 is compact. The launch lock seat 141 is cylindrical and is bolted or otherwise connected to the base 33. The bottom of the upper stage 48 matingly engages the launch lock seat 141 when the gimbaled platform 30 is in the stowed position by receiving a ridge 143 (FIG. 1) on the launch lock seat 141. The L-shaped intermediate stage 39 defines a space for the launch lock seat 141 between the first and second sides 42, 45. In other words, in the stowed position, the first and second sides 42, 45 of the intermediate stage 39 are each disposed adjacent the periphery of the launch lock seat 141. Further, because the inboard and outboard output gearboxes 51, 60 are on adjacent sides of the intermediate stage 39, the output gearboxes 51, 60 are co-planar, as seen in FIGS. 1–3. This arrangement of the output gearboxes 51, 60 is relatively compact and allows a heavy payload (e.g., an ion engine) to be mounted directly above the launch lock seat 141.

A separation nut assembly 150 is bolted or otherwise connected to the launch lock seat 141 which is bolted or otherwise connected to the base 33. The separation nut assembly 150 engages a bolt 156 (FIG. 7) during locking. The bolt 156 is also engaged, during locking, by a bolt catcher tube 159 (FIGS. 1 and 7) that is connected to the upper stage 48. Thus, the bolt 156 is in tension when the upper stage 48 is locked in mating engagement to the launch lock seat 141. The separation nut assembly 150 may comprise a pyrotechnic nut 153 (FIG. 7) having a threaded end that receives the bolt 156. Other pyrotechnic separation devices may be used such as a bolt cutter, a separation bolt, and a pin puller. Also, similar non-pyrotechnic assemblies might also be used. When the upper stage 48 is to be disconnected from the launch lock seat 141, the pyrotechnic nut 153 is fired, thereby releasing the bolt 156. The upper stage 48 is then capable of moving with respect to the launch lock seat 141.

When the upper stage 48 is attached to the launch lock seat 141 (i.e., locked), the gimbaled platform 30 has a load path which directs most forces originating in the upper stage 48 down from the upper stage 48 through the launch lock seat 141 and into the base 33. The load path includes the bolt catcher tube 159. This load path generally bypasses the intermediate stage 39, thereby reducing the loads experienced by the output gearboxes 51, 60. Without this arrangement, during launch, large loads resulting from a heavy engine mounted to the platform 30 could potentially damage the output gearboxes 51 and 60. The offset arrangement of the drive axes and the launch lock seat 141 also allows for large scale angle positioning without the use of a separate deployment actuator.

The operation of the inboard output gearbox 51 pivots the intermediate stage 39 around the first axis, which is parallel to the main shaft 57 of the inboard output gearbox 51. The main shaft 57 is housed in the first side 42 of the intermediate stage 39. The operation of the motor 75 drives the gearhead 81, which rotates the worm shaft 87, which rotates the worm 93 which, in turn, rotates the wormgear 96. The main shaft 57 then rotates around the first axis. In this fashion the intermediate stage 39 rotates around the first axis which lifts the second side 45 of the intermediate stage 39 with respect to the base 33. The housing 54 of the first output gearbox, the housing of the motor 75, and the housing of the gearhead 81 do not normally move with respect to the base 33 during operation.

The second output gearbox 60 operates similarly to the first output gearbox 51. The motor 78 connected to the gearhead 84 drives the gearhead 84 which rotates the worm shaft 114 of the second output gearbox 60. The worm 117 then rotates, causing the mating wormgear 120 to rotate. The main shaft 66 then rotates. The rotation of the main shaft 66 causes the upper stage 48 to rotate around the second axis, which is the axis parallel to the main shaft 66 in the second or outboard output gearbox 60. In this fashion, the upper stage 48 may be rotated for positioning any object that is located in the upper stage 48. Up to 67 degrees of rotation can be achieved around each axis.

An antibacklash feature may be used to insure precise motion of the wormgears 96, 120. For clarity, backlash and the antibacklash feature are only discussed below for the components of the first output gearbox 51, but similar backlash and a similar antibacklash feature also apply for the second output gearbox 60. Wormgear teeth 162 are narrower than the space between adjacent threads 165 of the worm 93. Without the antibacklash feature, backlash would occur, in part, when the direction of worm 93 rotation is reversed. Without the antibacklash feature, a change in direction of worm 93 rotation causes the worm 93 to switch from bearing against one side of the wormgear teeth 162 to bearing against the other side of the wormgear teeth 162. To accomplish that switch, the worm 93 has to be rotated until the worm thread 165 engages the wormgear teeth 162. That rotation involves operation of the motor 75 without any accompanying rotation of the wormgear 96 and, therefore, without any accompanying rotation of the intermediate stage 39 around the first axis. Such backlash results in lost motion and, consequently, in imprecision in the positioning platform 30 because the motor 75 moves without corresponding rotation of the intermediate stage 39 around the first axis.

The antibacklash feature includes torsion or antibacklash springs 168 (FIGS. 5 and 9) within the output gearboxes 51 to reduce or eliminate backlash in the worm shaft 87 and the wormgear 96. The springs 168 prevent backlash by providing torque that biases the wormgear teeth 162 against one side of the thread 165 of the worm 93. Thus, when the direction of rotation of the worm shaft 87 is reversed, the wormgear teeth 162 continue to bear on the same side of the thread 165 that the wormgear teeth 162 contacted during rotation of the worm shaft 87 in the other direction. Backlash is avoided because the wormgear teeth 162 do not switch from bearing against one side of the thread 165 to the opposite side of the thread 165 when the direction of worm shaft 87 rotation is reversed.

The springs 168 are mounted around the main shaft 57 and each spring 168 has a first end 171 (FIG. 9) and a second end 174 (FIG. 9). The wormgear 96 has a plurality of holes 177 for receiving the first end 171 of the springs 168. Although shown without teeth 162 in FIG. 9, the wormgear 96 in FIG. 9 has teeth 162. Six holes 177 are shown in the wormgear 96 in the Figures. The second end 174 of each spring 168 is anchored in a spring retainer plate 180. The spring retainer plate 180 has a plurality of holes 183 (four are shown in the Figures). The holes 183 are oriented so that the holes 183 are not in identical positions with respect to the adjacent corners of the retainer plate 180. This can be seen in FIG. 10, in which angles defined by the positions of the holes 183 and the center of the retainer plate 180 are not equal. The angles formed between each hole 183 and a line bisecting two opposing sides of the retainer plate 180 shown in FIG. 10 are: 43.13°, 50.62°, 46.87°, and 39.38°.

Each spring retainer plate 180 may be installed into the housing 54 of the output gearbox 51 in one of four positions. In other words, in embodiments having four holes 183, the retainer plate 180 may be oriented so that any one of the four holes 183 is located adjacent a particular corner of the housing 54. Because, in this embodiment, there are four differently oriented holes 183 in the retainer plate 180, and because the retainer plate can be positioned in four different positions in the housing 54, there are sixteen locations, relative to the housing 54, in which an end of the spring 168 can be positioned when mounted in the retainer plate 180.

The hole patterns in the wormgear 96 and spring retainer plates 180, and choice of retainer plate 180 orientation thus provide 96 unique initial positions for the torsion springs 168 in embodiments having six holes 177 in the wormgear 96 and four holes 183 in the retainer plate 180. The springs 168 may be installed to within 1.88°, resulting in very fine adjustability of torque. Low cost torsion springs 168 with relatively loose tolerances on torque and relatively loose tolerances of orientations of first and second spring ends 171, 174 may thus be used, while still providing a high degree of precision of the preloaded assembly. This arrangement also saves space since smaller springs may be used to provide a given minimum torque. A single anti-backlash spring 168 may be sufficient to obtain a desired amount of torque, in which case only a single antibacklash spring 168 per wormgear 96 is required.

The retainer plates 180 and wormgear 96 also provide spring aligning features which prevent cocking as the spring 168 is loaded. This is accomplished with a collar 186 on each side of the wormgear 96 and a collar 189 on the spring retainer plate 180. Each collar 186, 189 is sized such that a portion of the spring 168 at each end 171, 174 fits tightly against the collar 186, 189 as the spring 168 is loaded to the spring's initial position. This feature maintains alignment and eliminates rubbing of the spring 168 against the main shaft 57 or the housing 54, providing higher torque and less friction. The retention and alignment is accomplished without additional parts and fasteners commonly required for torsion spring assemblies. Collars similar to the collars 186, 189, respectively, may be disposed on the wormgear 120 and the spring retainer plate 180 of the second output gearbox 60.

As discussed above, when the gimbal 30 is in the stowed position, loads are generally directed from the upper stage 48 toward the base 33, bypassing the output gearboxes 51, 60 and, thereby, protecting the output gearboxes 51, 60 from severe loads. The output gearboxes 51, 60, particularly bearings 98, 100, 122, 124 and the wormgears 96, 120, are additionally protected by a mechanism for isolating the worms 93, 117 from their respective bearings 98, 100, 122 and 124.

Figure 11A:
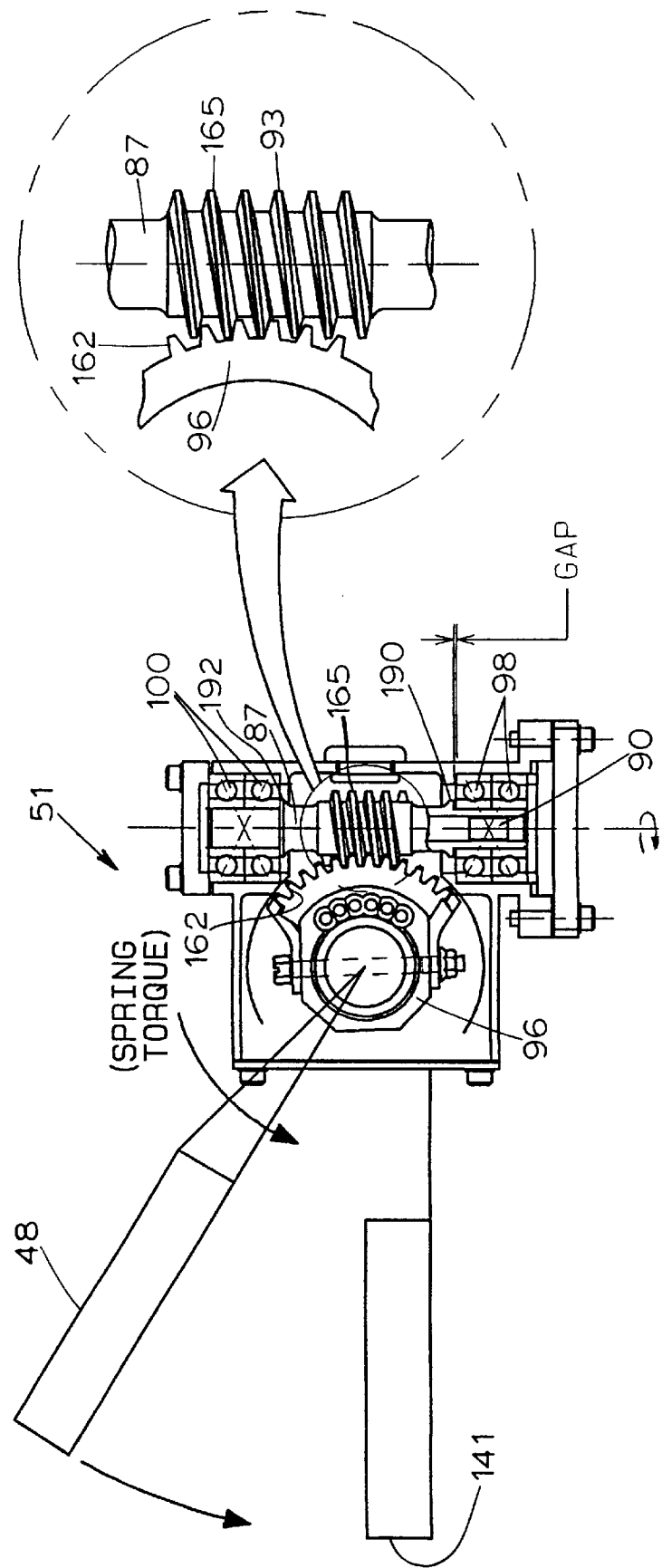
FIG. 11a is a fragmentary, side elevational view, with portions broken away, of an output gearbox in a position which corresponds with a gimbal operating in working range.
Figure 11B:
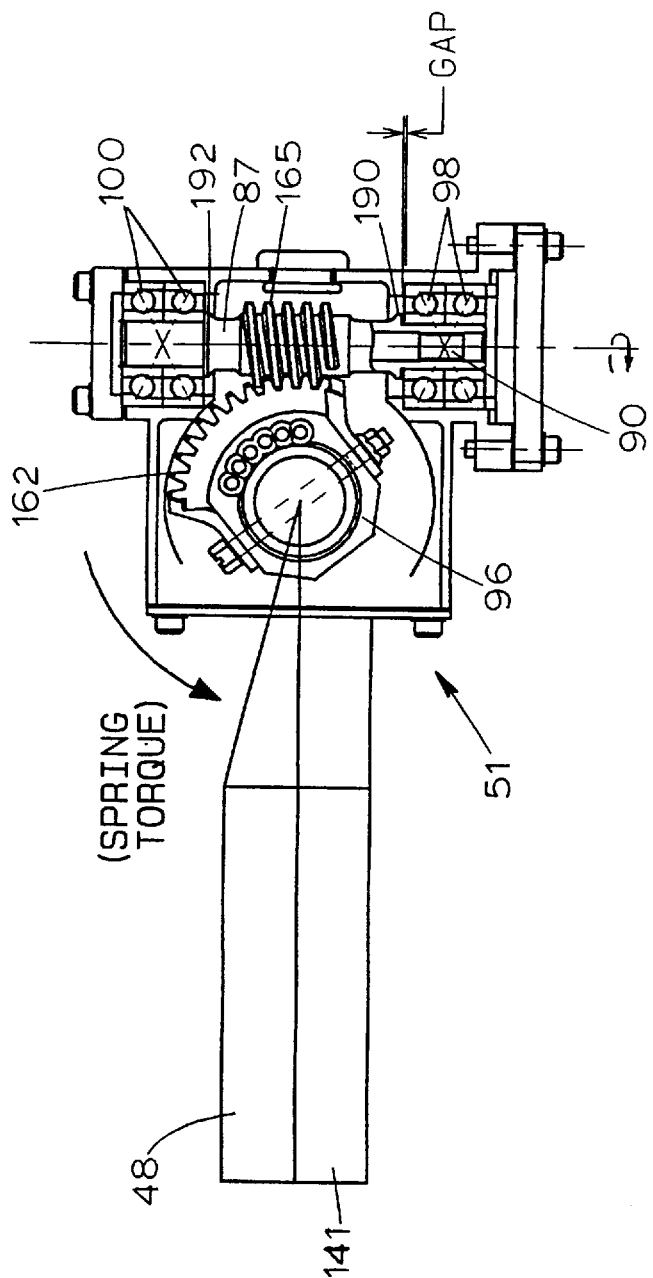
FIG. 11b is a fragmentary, side elevational view, with portions broken away, of the output gearbox of FIG. 11a in a position which corresponds with the gimbal operating when an upper stage, which is shown schematically, matingly engages a launch lock seat, which is also shown schematically.
Figure 11C:
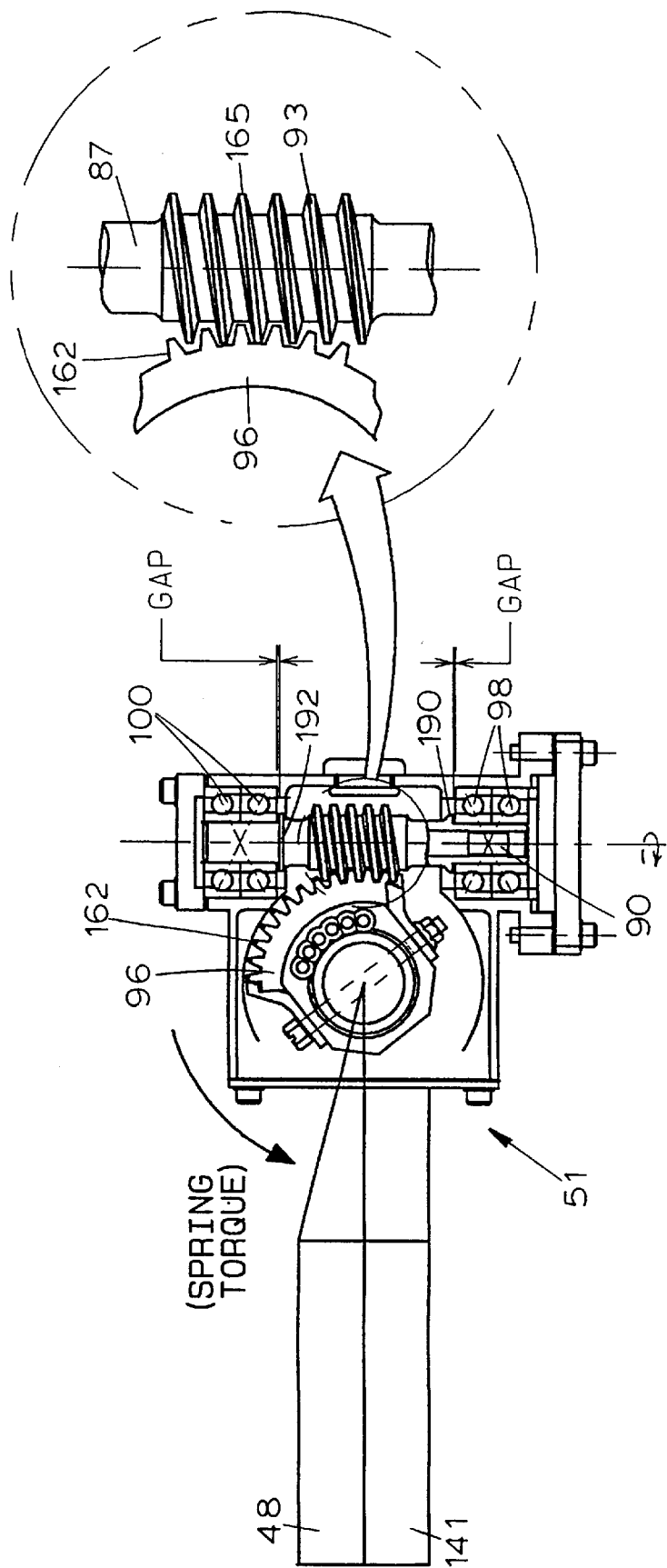
FIG. 11c is a fragmentary, side elevational view, with portions broken away, of the output gearbox of FIG. 11a in a position which corresponds with the rotation of the worm shaft in the output gearbox being stopped.

The operation of the isolation mechanism is shown in FIGS. 11a–11c. The worm 93 has a first shoulder 190 adapted to be seated against the first set of bearings 98, and a second shoulder 192 adapted to be seated against the second set of bearings 100. FIG. 11a shows the first output gearbox 51 in a position which corresponds with the gimbal 30 being in working range (i.e., when gimbal 30 is extended such that the upper stage 48 is not in contact with the launch lock seat 141). The upper stage 48 and the launch lock seat 141 are shown schematically in FIGS. 11a–11c. Also, the direction of worm 93 rotation which causes the movement of the upper stage 48 toward the launch lock seat 141 is indicated in FIGS. 11a–11c.

While in the working range, torque from the springs 168 bias the wormgear 96 in a counterclockwise direction (when viewed as shown in FIG. 11a) which preloads the wormgear 96 against the worm 93. As seen in the enlarged portion of FIG. 11a, some of the wormgear teeth 162 bear against the worm thread 165 while the wormgear 96 is preloaded against the worm 93. This causes the worm shaft 87 to be biased toward the second set of bearings 100. Thus, the second shoulder 192 of the worm shaft 87 is seated against the second set of bearings 100 during normal operation. However, during normal operation, there is a gap, seen in FIG. 11a, between the first shoulder 190 of the worm shaft 87 and the first set of bearings 98. It should be noted that the gimbal 30 can be configured so that the springs 168 provide torque in the direction opposite shown in FIGS. 11a–11c.

Referring to FIG. 11b, when the upper stage 48 first seats in the launch lock seat 141, the main shaft 57 and the wormgear 96 can no longer rotate in the direction that normally moves the upper stage 48 closer to the launch lock seat 141 (counterclockwise in FIGS. 11a–11c). Seating of the upper stage 48 in the launch lock seat 141 may be desired, for example, when locking the upper stage 48 to the launch lock seat 141 to attain a stowed position. After contact between the upper stage 48 and the launch lock seat 141 has just begun, the torque provided by the springs 168 no longer biases the wormgear 96 against the worm 93. The worm shaft 87 continues to rotate, however, without any corresponding rotation of the wormgear 96.

The rotation of the worm shaft 87 against the rigid wormgear 96 causes the worm shaft 87 to translate on its longitudinal axis toward the first set of bearings 98. The translation of the worm shaft 87 is toward the first set of bearings 98 because, in the configuration shown in FIGS. 11a–11c, during operation in the normal range, the worm 93 had been urging the wormgear teeth 162 toward the second set of bearings 100. When the wormgear 96 could no longer rotate in that direction, the worm shaft 87 translated in the opposite direction (i.e., away from the second set of bearings 100). This translation unseats the worm shaft 87 from the second set of bearings 100, creating a gap (seen in FIG. 11c) between the second shoulder 192 of the worm shaft 87 and the second set of bearings 100. A gap also remains between the first shoulder 190 and the first set of bearings 98, however, this gap is smaller than the gap between the first shoulder 190 and the first set of bearings 98 when the gimbal 30 is in the working range.

After the worm shaft 87 has translated to a position between the first and second sets of bearings 98, 100, a stop mechanism, one such mechanism is described in more detail below, prevents further rotation of the worm shaft 87, thereby maintaining the worm shaft 87 isolated between the first and second sets of bearings 98, 100 and preventing the worm shaft 87 from translating so far that the first shoulder 190 seats on the first set of bearings 98. FIG. 11c illustrates the first output gearbox 51 in a position in which the rotation of the worm shaft 87 has been stopped, and the worm shaft 87 is in a position between the first and second sets of bearings 98, 100. With the gaps between the worm shaft 87 and the first and second sets of bearings 98, 100, the worm shaft 87 is free to move longitudinally and is therefore isolated from loads encountered by the upper stage 48, the main shaft 57, or other parts of the drive train.

Once isolated, the worm shaft 87 is free to move with respect to the set of bearings 98, 100 on a longitudinal axis defined by the worm shaft 87, thus eliminating a rigid load path through the gimbal 30. As seen in the enlarged portion of FIG. 11c, the wormgear teeth 162 do not bear against the worm thread 165 when the worm shaft 87 is isolated. The worm shaft 87 is coupled to the gearhead 81 by a spline shaft 90 or other connection that permits the worm shaft 87 longitudinal movement with respect to the gearhead 81 while the upper stage 48 is locked to the launch lock seat 141. Because the rigid load path is eliminated, the set of bearings 98, 100 are also isolated from loads when the gimbal 30 is in the stowed position.

The separation nut 153 must be fired, releasing the bolt 156, before the gimbal 30 can be moved from the stowed position. Either one or both of the inboard gearbox 51 or outboard gearbox 60 may be used to move the upper stage 48 away from the launch lock seat 141. For clarity, only motion and components of the inboard gearbox 51 will be described below, but similar operation applies to the outboard gearbox 60. Upon release of the separation nut 153, the gearbox 50, upper stage 48 and launch lock seat 141 are as shown in FIG. 11c. From this position, initial rotation of the worm shaft 87 opposite in direction to that indicated in FIGS. 11a–11c causes it to translate until contact is made between the shoulder of worm shaft 87 and bearings 100. Further rotation of shaft 87 causes the worm gear 96, main shaft 57 and therfore upper stage 48 to move from the position shown in FIG. 11b, away from the launch lock seat 141, to a working position shown in FIG. 11c. Once the upper stage 48 loses contact with the launch lock seat 141, the antibacklash springs 168 bias the wormgear teeth 162 against the thread 165 of the worm 93, and the worm shaft 87 against the second set of bearings 100. Additional space between the shoulders 190, 192 of the worm shaft 87 and the respective set of bearings 98, 100 may be necessary to isolate the worm shaft 87. In other words, the distance from shoulder 190 to shoulder 192 on a single worm shaft 87 may be decreased to allow the worm shaft 87 a larger distance for longitudinal movement when unseated from the set of bearings 98, 100. The additional space between each bearing and the adjacent worm shaft shoulder is not detrimental to operation of the output gearbox 51, because when driving is desired and the worm shaft 87 is seated in the second set of bearings 100, biasing from the antibacklash springs 168 keeps the wormgear teeth 162 in contact with the worm 93 and the worm shaft shoulder 192 seated against the set of bearings 100.

The second output gearbox 60 may have a mechanism for isolating the worm 117 from the set of bearings 122, 124 which is similar to the mechanism described above for isolating the worm 93 from the set of bearings 98, 100.

Backlash may alternatively or additionally be created in other parts of the output gearbox to isolate the set of bearings 98, 100 and the wormgear 96 from forces. For example, a loosely fitting spline shaft, a loosely fitting key connection, or a loosely fitting pin could be used to connect the wormgear 96 to main shaft 57 or to connect one or more of the main shafts 57, 66 to a respective stage 39, 48 and, thereby, create backlash. But backlash originating from one of these sources would require antibacklash springs located in positions other than the springs 168.

Figure 12:
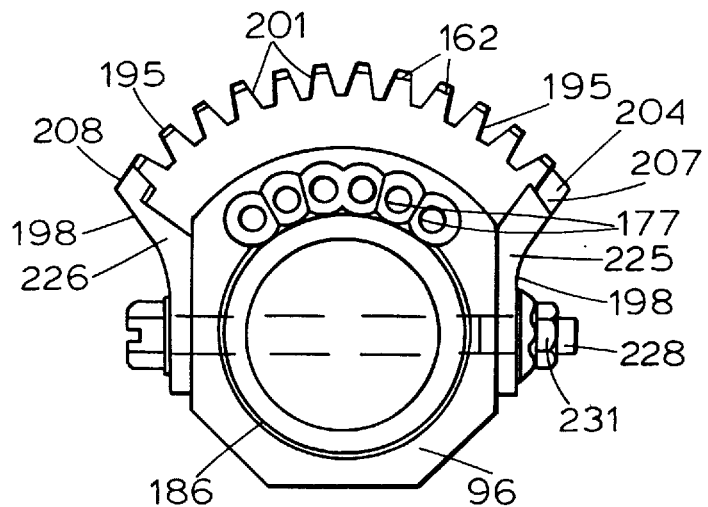
FIG. 12 is a side elevational view of one embodiment of a wormgear in accordance with the present invention.
Figure 13:
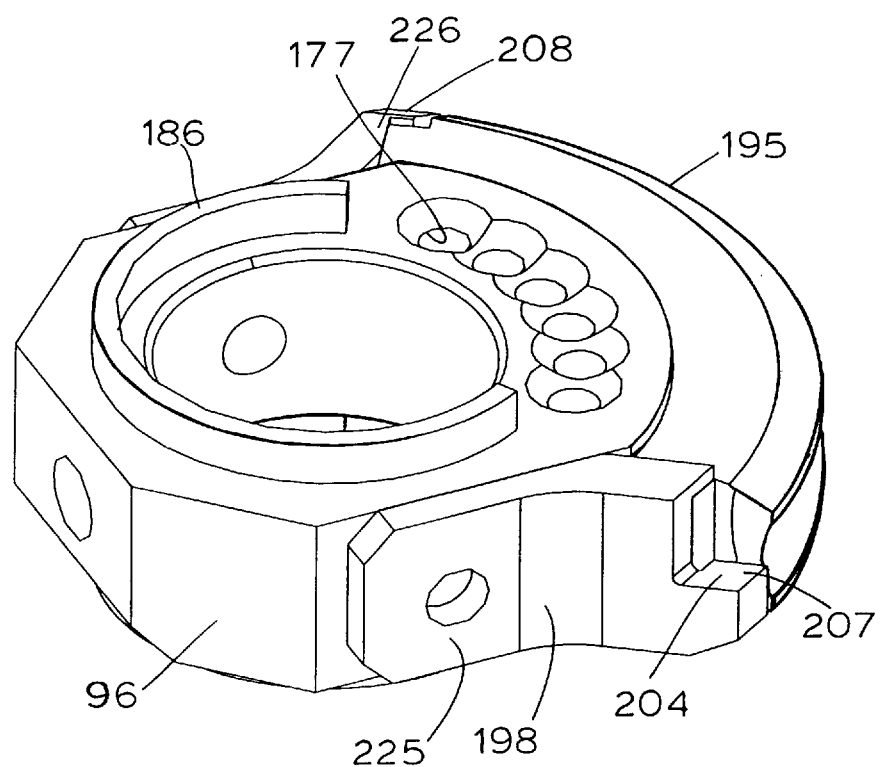
FIG. 13 is a perspective of the wormgear of FIG. 12 with individual teeth of the teeth region not shown.
Figure 14A:
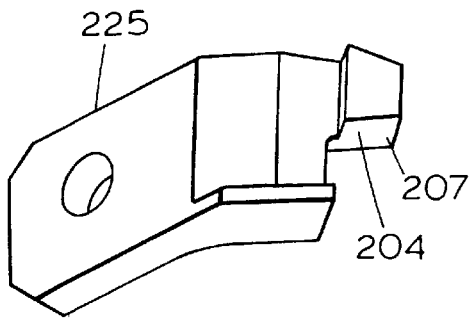
FIG. 14a is a perspective of one of the travel stops of the wormgear of FIG. 12.
Figure 14B:
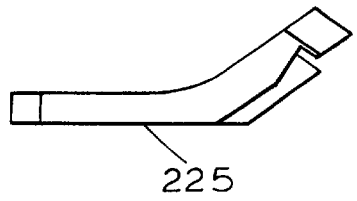
FIGS. 14b–14g are various side elevational views of the travel stops of FIG. 12.
Figure 14C:
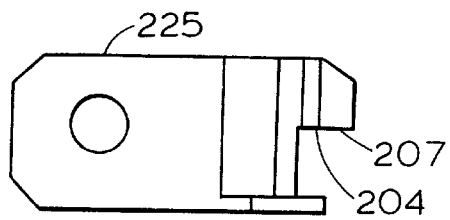
Figure 14E:
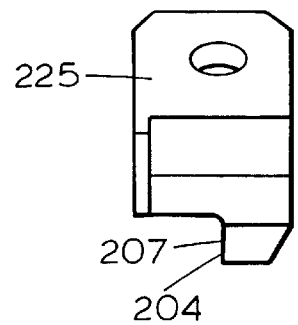
Figure 14D:
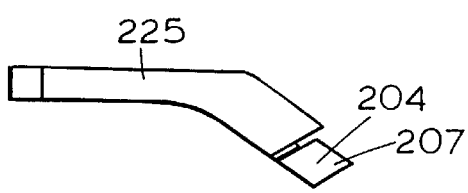
Figure 14F:
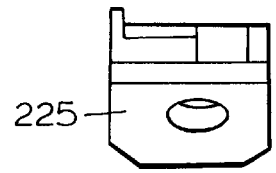
Figure 14G:
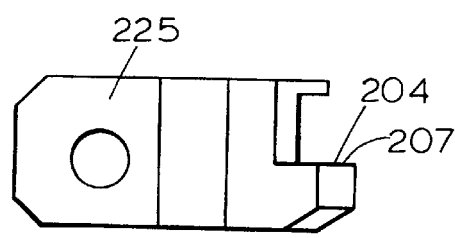

Referring now to FIGS. 12 and 13, the wormgear 96 has structure for stopping the rotation of the worm 93. The peripheral portion of the wormgear 96 has a teeth region 195 that extends for less than 360° of the wormgear 96 periphery. Although the wormgear 96 in FIG. 13 is illustrated without teeth 162 in the teeth region 195, the wormgear 96 of FIG. 13 has teeth 162. The teeth region 195 terminates at a toothless peripheral portion 198. The wormgear teeth 162 define spaces 201 in the peripheral portion of the wormgear 96. A first travel stop 204 having a first contacting surface 207 is disposed at one end of the teeth region 195, and a second travel stop 208 having a second contacting surface (not shown) is disposed at the other end of the teeth region 195. The amount of rotation that the wormgear 96 can undergo is determined by the angle of the arc formed between it's first and second stops 204, 208 (i.e., the angle of the arc formed by the teeth region 195), and the number of turns made by the thread of the worm 165 between it's first and second stop surfaces 216, 222.

Figure 15:
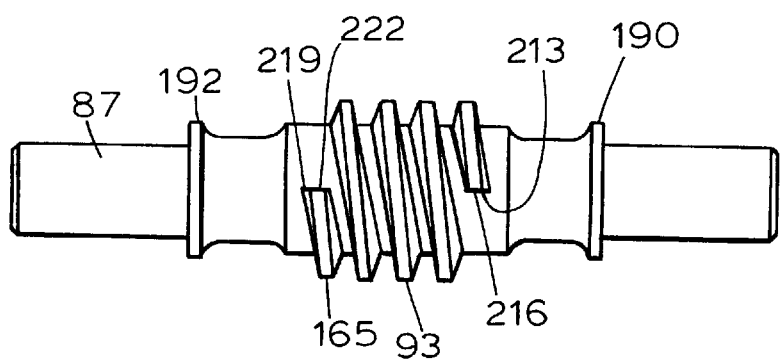
FIG. 15 is a side elevational view of a worm shaft in accordance with the present invention.

Referring now to FIG. 15, the worm 93 terminates at a first end 213 having a first contacting surface 216 and a second end 219 having a second contacting surface 222. The first stop 204 is located at a position that will stop the progress of the worm 93 through the wormgear 96 by contacting the first end 213 of the worm 93. This position is essentially where a space between teeth would be located if the teeth region 195 continued into the toothless peripheral region 198. The second stop 208 is located at a position that will stop the progress of the worm 93 through the wormgear 96 by contacting the second end 219 of the worm 93. This position is essentially where a space between teeth would be located if the teeth region 195 continued into the toothless peripheral region 198. Rotation of the worm 93 in one direction is stopped by the first stop 204 when a predetermined amount of wormgear 96 rotation has occurred and rotation of the worm 93 in the opposite direction is stopped by the second stop 208 when a predetermined amount of rotation in that direction has occurred.

The stops 204, 208 in the wormgear 96 provide a mechanism for stopping because after one of the ends 213, 219 of the worm 93 rotates past the tooth 162 adjacent one of the stops 204, 208, that end of the worm 93 will contact the contacting surfaces of the stops 204, 208 and will then be prevented from further rotation in that direction. The wormgear stopping mechanism is advantageous because it stops rotation of the worm 93 using two relatively flat surfaces (i.e., the respective contacting surfaces of the stops 204, 208, and the ends 213, 219 of the worm 93) in contact with one another rather than having the worm 93 experience high stresses from wedging in the wormgear 96 and, potentially, jamming in the wormgear 96. Also, because the torque of the wormgear 96 is so much greater than the torque of the worm shaft 87, less force is required to stop the worm shaft 87.

In embodiments of the gimbal 30 having the wormgear stopping mechanism, the contacting surface 216 of the worm 93 is in contact with the contacting surface 207 of the stop 204 when the gimbal 30 is in the stowed position. Also, the contacting surface 222 of the worm 93 is in contact with the contacting surface of the stop 208 when the gimbal 30 is in the maximum travel position. The wormgear stopping mechanism can be used with the isolation mechanism described earlier to stop worm shaft 87 rotation, leaving the worm shaft 87 unseated between the first and second sets of bearings 98, 100.

In a preferred embodiment, contact of the worm surface 222 with the stop surface 208 and the worm surface 216 with the stop surface 214 is of essentially flat and parallel surfaces occuring on the midplane of the wormgear (perpendicular to the main shaft). This is a plane also containing the longitudinal axis of the worm. Therefore, the worm surfaces 222 and 216 are radial with respect to the worm pitch diameter and parallel to the worm's longitudinal axis. Also, stop surfaces 208 and 214 are radial with respect to the wormgear pitch diameter and are perpendicular to the main shaft.

Similar mating stop surfaces may be used which make contact on planes other than that described in the preferred embodiment. In these cases stop surface positions and orientations would be adjusted accordingly. Other possible embodiments may use stop contact surfaces which are conforming and parallel but not flat or which have other than surface contact. For example, the contacting surfaces 216, 222 of the worm 93 may be tapered to a dull point rather than flat.

The stops 204, 208 may be placed in spaces 201 between adjacent wormgear teeth 162 rather than at the ends of the teeth region 195. In this fashion, a wormgear 96 having a teeth region 195 extending all 360° around the circumference of the wormgear 96 (i.e., a wormgear 96 altogether lacking a toothless peripheral portion 198) may have the stops 204, 208. The stops 204, 208 in such an embodiment may be inserted simply by filling in, at least partially, a space 201 between any two adjacent teeth 162.

The stops 204, 208 may take various forms. For example, as seen in FIGS. 12, 13, and 14*a*–14*g*, the stop 204 may be on a member 225 that is attached to the side of the wormgear 96 adjacent the end of the teeth region 195 using a bolt 228 and a nut 231 or other suitable fastening means. The stop 208 can be on a member 226 that is similar or identical to the member 225 but that is attached to the opposite side of the wormgear 96 and has a contacting surface facing a direction opposite to the contacting surface 207. Alternatively, the stops 204, 208 may be an epoxy filling in a space normally defined between the toothless peripheral portion 198 and the teeth region 195. The stops 204, 208 may be pins (not shown) lodged partially in radial bores (not shown) in the wormgear 96, the portions of the pins extending out of the bores acting as stops. The stops 204, 208 may be material attached to the wormgear 96 in any suitable fashion such as with adhesive or by welding. The stops 204, 208 may be integral with the tooth or teeth 162 immediately adjacent the stops 204, 208.

Figure 18:
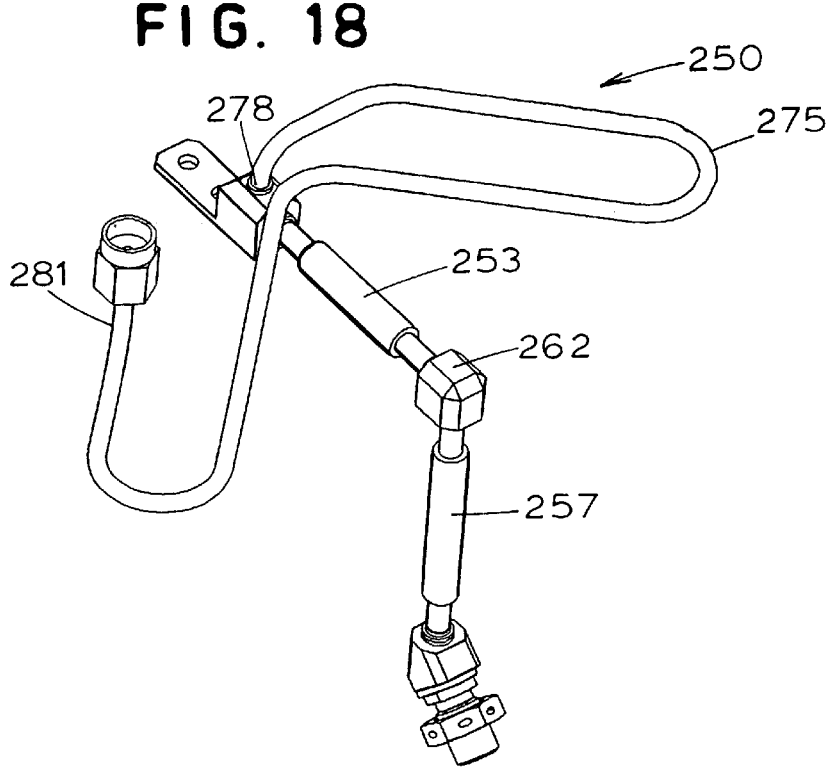
FIG. 18 is a perspective of the fuel line assembly of FIG. 17 in a free state.
Figure 19:
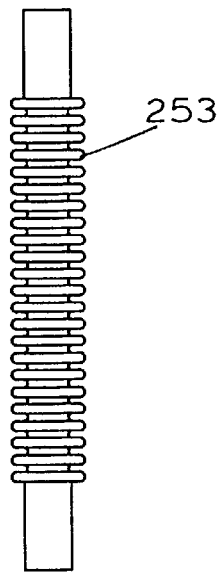
FIG. 19 is a side elevational view of a bellows tube suitable for use with the fuel line assembly of FIG. 17.
Figure 17:
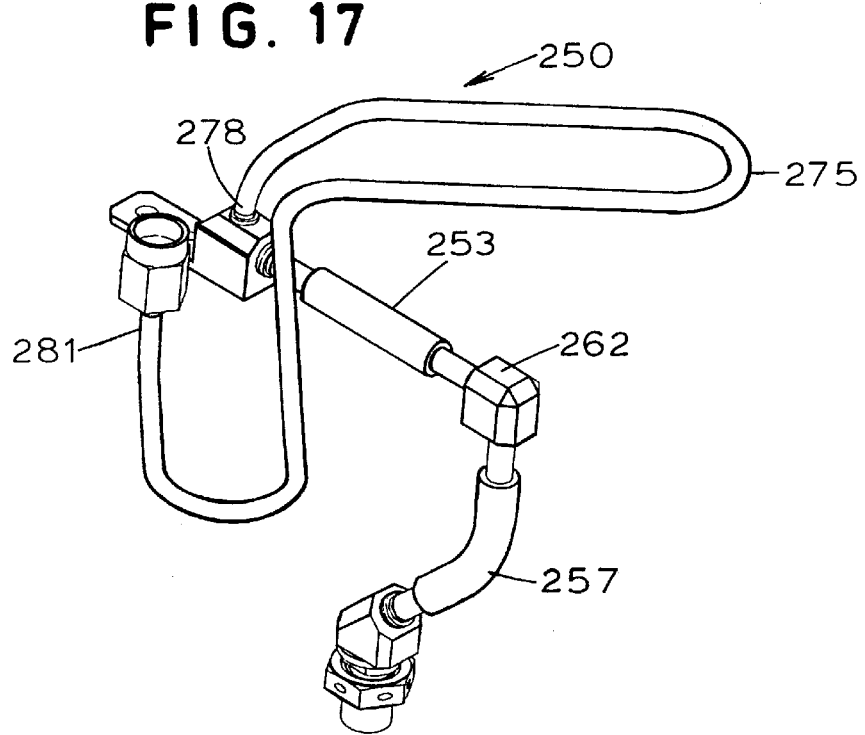
FIG. 17 is a perspective of the fuel line assembly of the gimbal of FIG. 16.

The gimbaled platform can undergo a very large angle of rotation from the stowed position to the fully extended position. If the gimbaled platform is being used to position an ion thruster for a spacecraft, then a special fuel line assembly may be necessary. A suitable fuel line assembly is shown in FIGS. 16–18 and is designated at 250. The fuel line assembly 250 comprises first and second metal bellows tubes 253, 257 joined by an elbow fitting 262 having first and second apertures. The bellows tubes 253, 257 are depicted schematically in FIGS. 16–18, but FIG. 19 shows a bellows tube in greater detail that is suitable to be used as one of the tubes 253, 257.

Preferably, the first and second tubes 253, 257 are joined to the elbow fitting 262 to form a right angle in their free state. The free state of a tube is the state in which the tube is not experiencing stress. The second tube 257 is shown curved in FIGS. 16 and 17, because those Figures show the assembly 250 in the position that corresponds with the gimbal 30 being stowed. When the gimbal is in the stowed position, the second tube 257 undergoes stresses and is not in the free state.

Preferably, the assembly 250 is mounted such that the tubes 253, 257 are in their free state when both the intermediate stage 39 and the upper stage 48 are at approximately the midpoint of travel around the respective first and second axes of the respective first and second output gearboxes. To accomplish this, a plane containing both the first and second tubes 253, 257, when those tubes are both in the free state, bisects the right angle formed by the first and second axes of the respective first and second output gearboxes.

As noted above, when the gimbal 30 is in the stowed position, the second tube 257 is not in the free state. At the other extreme, when the gimbal 30 is fully extended, the second tube bends the other way. The problem of torsion around the axes of the first and second tubes 253, 257 is avoided by use of this arrangement since torsion about either one of the tubes 253, 257 is essentially relieved by bending flexure of the other. The fatigue life of the fuel line assembly 250 is greatly improved since all flexing is within the elastic range of the tubes 253, 257.

When used to connect a fuel tank (not shown) to an ion thruster of a spacecraft, the second tube 257 is connected at one end to the elbow joint 262, and the other end of the second tube 257 is connected to plumbing terminating at the fuel tank. A conventional propulsion tube 275 having first and second ends 278, 281 may also be a component of the fuel line assembly 250. The propulsion tube 275 has the first end 278 connected to one end of the first tube 253, and the second end 281 connected to the ion thruster (not shown). The propulsion tube 275 is not a part of the invention but the propulsion tube 275 is a part of a conventional fuel line. The portion of the fuel line 250 having the elbow joint 262 and the first and second tubes 253, 257 is, in effect, a way of connecting a fuel tank to a conventional propulsion tube that, in turn, is connected to an ion thruster.

The above detailed description is provided for clearness of understanding only and no unnecessary limitations therefrom should be read into the following claims.

What is claimed is:

1. An angle positioning platform for positioning objects around first and second axes, the angle positioning platform comprising:

a base;

a launch lock seat connected to the base;

an intermediate stage having first and second sides;

first pivoting means comprising a first worm shaft and a first set of bearings adapted to engaged the first worm shaft, the first pivoting means being mounted to the base and the first side of the intermediate stage for pivoting the intermediate stage around the first axis;

second pivoting means comprising a second worm shaft and a second set of bearings adapted to engage the second worm shaft, the second pivoting means being connected to the second side of the intermediate stage;

an upper stage connected to the second pivoting means, the second pivoting means pivoting the upper stage around the second axis;

first isolation means for isolating vibration of the upper stage from the first set of bearings, the first isolation means including means for unseating the first worm shaft from the first set of bearings; and second isolation means for isolating vibration of the upper stage from the second set of bearings, the second isolating means including means for unseating the second worm shaft from the second set of bearings.

2. The angle positioning platform of claim 1 wherein:

the first worm shaft unseats from the first set of bearings after the upper stage matingly engages the launch lock seat; and the second worm shaft unseats from the second after the upper stage matingly engages the launch lock seat.

3. The angle positioning platform of claim 2 wherein:

a shoulder of the first worm shaft and a shoulder of the second worm shaft are unseated from the respective set of bearings, after the upper stage is matingly engaged to the launch lock seat, permitting longitudinal movement of the worm shafts relative to the respective set of bearings.

4. An angle positioning platform for positioning an object along first and second axes, the angle positioning platform being located on a spacecraft and comprising:

a base connected to the spacecraft;

a launch lock seat connected to the base;

an inboard output gearbox mounted to the base;

an intermediate stage having first and second sides, the first side being substantially parallel to the first axis, the second side being substantially parallel to the second axis, the first side being connected to the inboard output gearbox, the inboard output gearbox positioning the object around the first axis;

an outboard output gearbox connected to the second side of the intermediate stage, the outboard output gearbox positioning the object around the second axis; and an upper stage connected to the outboard output gearbox for mounting the object;

the first and second axes being substantially coplanar and substantially perpendicular to one another.

5. The angle positioning platform of claim 4 wherein the first and second sides of the intermediate stage define a space therebetween in which at least a part of the launch lock seat is located.

6. The angle positioning platform of claim 4 wherein the object is an ion thruster.

7. The angle positioning platform of claim 4 wherein the upper stage matingly engages the launch lock seat when the platform is in a locked position.

8. The angle positioning platform of claim 7 wherein, when the angle positioning platform is in the locked position, a solid load path is formed from the upper stage to the launch lock seat, the solid load path normally directing loads in a direction that bypasses the intermediate stage.

9. An angle positioning platform for positioning objects around first and second axes, the angle positioning platform comprising:

a base;

a first output gearbox mounted to the base;

an intermediate stage having first and second sides, the first side being substantially parallel to the first axis, the second side being substantially parallel to the second axis, the first side being connected to the first output gearbox;

a second output gearbox connected to the second side of the intermediate stage;

the first and second output gearboxes each comprising a worm shaft having a worm, a wormgear adapted for mating engagement with the worm, and a main shaft connected to the wormgear;

an upper stage connected to the second output gearbox;

a spring mounted around the main shaft and having a first end, a first end portion, a second end, and a second end portion; and a spring retainer plate mounted around the main shaft;

one of the spring retainer plate and the wormgear comprising a plurality of holes for receiving an end of the spring.

10. The angle positioning platform of claim 9 wherein:

the spring retainer plate comprises a collar for receiving the first end portion of the spring.

11. The angle positioning platform of claim 9 wherein:

the wormgear comprises a plurality of holes, each of the plurality of wormgear holes being adapted to receive the second end of the spring.

12. The angle positioning platform of claim 11 wherein:

the wormgear has a collar for receiving the second end portion of the spring.

13. The angle positioning platform of claim 9 wherein:

the spring retainer plate comprises a plurality of holes for receiving the first end of the spring; and the wormgear comprises a plurality of holes, each of the plurality of wormgear holes being adapted to receive the second end of the spring.

14. The angle positioning platform of claim 13 wherein:

the spring retainer has a collar for receiving the first end portion of the spring; and the wormgear has a collar for receiving the second end portion of the spring.

15. The angle positioning platform of claim 14 wherein:

the spring retainer plate comprises four corners and a hole adjacent each corner; and the wormgear comprises six holes.

16. An angle positioning platform for positioning objects around first and second axes, the angle positioning platform comprising:

a base;

a first output gearbox mounted to the base;

an intermediate stage having first and second sides, the first side being substantially parallel to the first axis, the second side being substantially parallel to the second axis, the first side being connected to the first output gearbox;

a second output gearbox connected to the second side of the intermediate stage;

the first and second output gearboxes each comprising a worm shaft having a worm, a wormgear having teeth and spaces defined between the teeth adapted for mating engagement with the worm, and a main shaft connected to the wormgear; and an upper stage connected to the second output gearbox;

at least one of the worms having a thread that terminates at a first end;

the wormgear engaged to the at least one worm having a stop disposed adjacent one of the teeth for stopping the rotation of the worm shaft by contacting the first end of the worm thread.

17. The angle positioning platform of claim 16 wherein:

both of the worms have a thread that terminates at a first end;

each wormgear has a stop disposed adjacent one of the teeth for stopping the rotation of the worm shaft engaged to the wormgear by contacting the first end of the worm thread engaged to the wormgear.

18. The angle positioning platform of claim 17 wherein:

the first ends of the worms are substantially flat and each defines a plane that is substantially parallel to a longitudinal axis of the respective worm shaft; and the stops are substantially flat and each defines a plane that is substantially perpendicular to the longitudinal axis of the respective main shaft.

19. The angle positioning platform of claim 16 wherein:
the first end of the worm is substantially flat and defines a plane that is substantially parallel to a longitudinal axis of the worm shaft to which the worm is connected.

20. The angle positioning platform of claim 16 wherein:
the stop is substantially flat and defines a plane that is substantially perpendicular to the adjacent main shaft.

21. The angle positioning platform of claim 16 wherein:
the stop has a contacting surface;
the teeth have a thickness defined as the dimension of the teeth parallel to the main shaft; and
the stop is thinner than the thickness of the teeth such that the contacting surface is recessed.

22. The angle positioning platform of claim 21 wherein:
the contacting surface is substantially flat and defines a plane that is substantially perpendicular to the main shaft.

* * * * *